United States Patent
Kouyama et al.

(10) Patent No.: US 8,722,295 B2
(45) Date of Patent: May 13, 2014

(54) TONER FOR ELECTROSTATIC IMAGE DEVELOPMENT AND PRODUCTION PROCESS THEREOF

(75) Inventors: Mikio Kouyama, Tokyo (JP); Ken Ohmura, Tokyo (JP)

(73) Assignee: Konica Minolta Business Technologies, Inc., Tokyo (JP)

( * ) Notice: Subject to any disclaimer, the term of this patent is extended or adjusted under 35 U.S.C. 154(b) by 41 days.

(21) Appl. No.: 13/612,038

(22) Filed: Sep. 12, 2012

(65) Prior Publication Data

US 2013/0078566 A1      Mar. 28, 2013

(30) Foreign Application Priority Data

Sep. 28, 2011   (JP) .................................. 2011-212330

(51) Int. Cl.
*G03G 9/087* (2006.01)
*G03G 9/08* (2006.01)

(52) U.S. Cl.
CPC ............ *G03G 9/0806* (2013.01); *G03G 9/0804* (2013.01); *G03G 9/08704* (2013.01); *G03G 9/08706* (2013.01); *G03G 9/08788* (2013.01)
USPC .................................. 430/109.3; 430/137.14

(58) Field of Classification Search
CPC ............. G03G 9/0804; G03G 9/0806; G03G 9/08704; G03G 9/08706; G03G 9/08788
USPC .......................................... 430/109.3, 137.14
See application file for complete search history.

(56) References Cited

FOREIGN PATENT DOCUMENTS

| JP | 2009-057294 | 3/2009 |
|---|---|---|
| JP | 2010-043203 | 2/2010 |
| JP | 2010-210959 | 9/2010 |
| JP | 2010-285555 | 12/2010 |

OTHER PUBLICATIONS

English translation of Japanese Office Action, Official Notice of Reason for Refusal, Japanese Patent Application No. 2011-212330, Drafting Date: Oct. 9, 2013 (2 pages).

*Primary Examiner* — Peter Vajda
(74) *Attorney, Agent, or Firm* — Lucas & Mercanti, LLP

(57) ABSTRACT

Disclosed are a low-environmental load toner for electrostatic image development and a production process of the toner. The toner for electrostatic image development includes toner particles containing a resin. The resin contains a vinyl polymer having a structural unit represented by the following general formula (1):

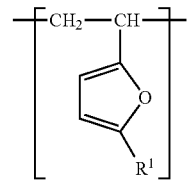

[in the general formula (1), $R^1$ is a hydrogen atom, $-CH_2OH$, $-CH_2OR^2$, or $-CH_2O(C=O)R^3$, and $R^2$ and $R^3$ are each an alkyl group having 1 to 8 carbon atoms].

9 Claims, No Drawings

TONER FOR ELECTROSTATIC IMAGE DEVELOPMENT AND PRODUCTION PROCESS THEREOF

CROSS REFERENCE TO RELATED APPLICATION

This Application claims the priority of Japanese Patent Application No. 2011-212330 filed on Sep. 28, 2011, which is incorporated by herein by reference.

TECHNICAL FIELD

The present invention relates to a toner for electrostatic image development that is used in image formation of an electrophotographic system (which hereinafter may be simply referred to as a "toner") and to a production process thereof.

BACKGROUND ART

Laws such as the "Law Concerning the Promotion of Procurement of Eco-Friendly Goods and Services by the State and Other Entities (Law on Promoting Green Purchasing)" have been enforced, and it is contemplated to use raw materials other than those derived from petroleum. For example, there is a demand to use low environmental load toners such as a toner containing, as a binder resin, biomass plastic obtained from a raw material derived from an organic resource other than fossil resources.

Examples of the material derived from an organic resource ether than fossil resources include those disclosed in Patent Literatures 1 and 2.

CITATION LIST

Patent Literature

Patent Literature 1: Japanese Patent Application Laid-Open No. 2009-57294

Patent Literature 2: Japanese Patent Application Laid-Open No. 2010-043203

SUMMARY OF INVENTION

Technical Problem

The present invention has been made in view of the foregoing circumstances, and has as its object the provision of a low environmental load toner for electrostatic image development and a production process thereof.

Solution to Problem

According to the present invention, there is provided a toner for electrostatic image development, the toner comprising toner particles containing a resin, wherein the resin contains a vinyl polymer having a structural unit represented by the following general formula (1).

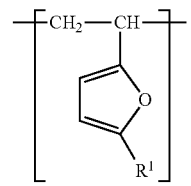

General formula (1)

[in the general formula (1), $R^1$ is a hydrogen atom, —$CH_2OH$, —$CH_2OR^2$, or —$CH_2O(C=O)R^3$, and $R^2$ and $R^3$ are each an alkyl group having 1 to 8 carbon atoms.]

In the toner for electrostatic image development of the present invention, the vinyl polymer may preferably be a polyvinylfuran (co)polymer, a polyhydroxymethylvinylfuran (co)polymer, a polymethoxymethylvinylfuran (co)polymer, a polyethoxymethylvinylfuran (co)polymer, a polypropoxymethylvinylfuran (co)polymer, a polybutoxymethylvinylfuran (co)polymer or a polyacetoxymethylvinylfuran (co)polymer.

In the toner for electrostatic image development of the present invention, the vinyl polymer may preferably be a copolymer having the structural unit represented by the above general formula (1) and a structural unit derived from a (meth)acrylate monomer.

In the toner for electrostatic image development of the present invention, the vinyl polymer may preferably be a copolymer having the structural unit represented by the above general formula (1), a structural unit derived from a (meth)acrylate monomer, and a structural unit derived from a styrene monomer.

In the toner for electrostatic image development of the present invention, in the structural unit represented by the above general formula (1), $R^1$ may preferably be —$CH_2OR^2$, and $R^2$ may preferably be an alkyl group having 1 to 4 carbon atoms.

In the toner for electrostatic image development of the present invention, the content of the structural unit represented by the above general formula (1) in the resin may preferably be 30 to 77% by mass.

In the toner for electrostatic image development of the present invention, the content of the structural unit represented by the above general formula (1) in the toner particles may preferably be 27 to 70% by mass.

According to the present invention, there is provided a production process of a toner for electrostatic image development, which is a process of producing the above-described toner for electrostatic image development, the process comprising:

synthesizing a vinyl polymer having a structural unit represented by the above general formula (1) through a polymerization reaction performed in an aqueous medium using at least a polymerizable monomer represented by the following general formula (2).

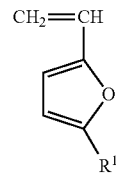

General formula (2)

[in the general formula (2), $R^1$ is a hydrogen atom, —$CH_2OH$, —$CH_2OR^2$, or —$CH_2O(C=O)R^3$, and $R^2$ and $R^3$ are each an alkyl group having 1 to 8 carbon atoms.]

The production process of the toner for electrostatic image development according to the present invention preferably further comprises forming the toner particles by aggregating fine resin particles formed of the vinyl polymer in an aqueous medium.

Advantageous Effects of Invention

The toner for electrostatic image development of the present invention comprises toner particles including a resin containing a vinyl polymer having a specific structural unit, and the specific structural unit can be obtained from a raw material derived from a plant. Therefore, environmental loads can be reduced and suppressed.

In the toner for electrostatic image development of the present invention, since the resin forming the toner particles includes the specific structural unit, high electrification stability is obtained, and accordingly excellent transfer properties are obtained. Therefore, image stability when a large number of sheets are printed is high.

This may be because of the following reason. The resin making up the toner particles includes the specific structural unit. An oxygen atom in a furanyl group contained in the specific structural unit has $sp^2$ hybridised orbitals as in carbon atoms in the furanyl group, and the structural part of the furanyl group has a dipolar resonance hybrid structure, so that the electrification rise time of the toner is shortened. This may suppress excessive electrification during long-term stirring and a change in image density caused by the excessive electrification.

DESCRIPTION OF EMBODIMENTS

The present invention will hereinafter be described specifically.

Toner:

The toner of the present invention comprises toner particles including a binder resin containing a vinyl polymer having the structural unit represented by the above general formula (1) (this structural unit may be hereinafter referred to as a "specific vinylfuran structural unit," and the above vinyl polymer may be hereinafter referred to as a "specific vinyl polymer"). The toner particles may further contain, if necessary, a colorant, a magnetic powder, a parting agent, a charge control agent, etc.

In the above general formula (1) representing the specific vinylfuran structural unit, $R^1$ is a hydrogen atom, —$CH_2OH$, —$CH_2OR^2$, or —$CH_2O(C=O)R^3$, and $R^2$ and $R^3$ are each an alkyl group having 1 to 8 carbon atoms.

Preferably, in the specific vinylfuran structural unit, $R^1$ is —$CH_2OR^2$, and $R^2$ is an alkyl group having 1 to 4 carbon atoms.

As described later, the specific vinylfuran structural unit is introduced into the specific vinyl polymer through a radical polymerization reaction using the polymerizable monomer represented by the above general formula (2) (this polymerizable monomer may hereinafter be referred to as a "specific vinylfuran monomer").

This specific vinyl furan monomer can be synthesized using, as a starting material, a non-edible plant that can be obtained from, for example, sawdust or a byproduct of fermentation of bioalcohol.

For example, the specific vinylfuran monomer can be synthesized by using hydroxymethylfurfural (HMF) as a starting material, converting, if necessary, —$CH_2OH$ to —$CH_2OR^2$ or —$CH_2O(C=O)R^3$, and perforating a Wittig reaction. One example of this process is shown in the following reaction formula (A). Hydroxymethylfurfural (HMF) together with methanol is heated in p-toluenesulfonic acid to convert the HMF to 5-methoxyfurfural (MMF). Then the MMF is subjected to the Wittig reaction with methylphosphonium bromide in an organic solvent such as 1,4-dioxane mixed with water in the presence of potassium carbonate, whereby methoxymethylvinylfuran (HMVF) can be synthesized.

A specific vinylfuran monomer in which $R^1$ in the above general formula (2) is a hydrogen atom can be synthesized by using, as the starting material, furfural instead of hydroxymethylfurfural and performing the same Wittig reaction as that described above.

Reaction formula (A)

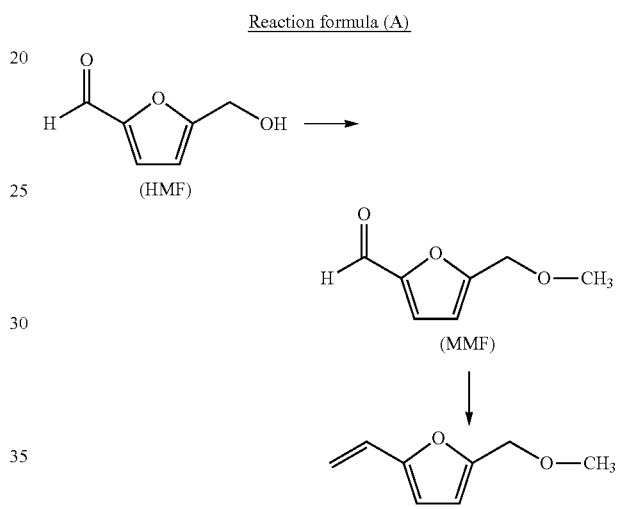

The specific vinyl polymer may be a homopolymer having only the specific vinylfuran structural unit or may be a copolymer having the specific vinylfuran structural unit and a structural unit derived from another polymerizable monomer (this copolymer may hereinafter be referred to as a "specific vinyl copolymer"). Preferably, the specific vinyl polymer is the specific vinyl copolymer.

As examples of the other polymerizable monomer that can be used for the formation of the specific vinyl copolymer, may be mentioned (meth)acrylate monomers, styrene monomers, polymerizable monomers having an ionic leaving group, 4-acetoxystyrene, 3-methoxy-4-acetoxystyrene, methylisoeugenol, methyleugenol, 4-acetoxyisoeugenol and 4-acetoxyeugenol.

Specific examples of the (meth)acrylate monomers include: methacrylate derivatives such as methyl methacrylate, ethyl methacrylate, n-butyl methacrylate, isopropyl methacrylate, isobutyl methacrylate, t-butyl methacrylate, n-octyl methacrylate, 2-ethylhexyl methacrylate, stearyl methacrylate, lauryl methacrylate, phenyl methacrylate, diethylaminoethyl methacrylate, and dimethylaminoethyl methacrylate; and acrylate derivatives such as methyl acrylate, ethyl acrylate, isopropyl acrylate, n-butyl acrylate, t-butyl acrylate, isobutyl acrylate, n-octyl acrylate, 2-ethylhexyl acrylate, stearyl acrylate, lauryl acrylate and phenyl acrylate. Of these, n-butyl acrylate and 2-ethylhexyl acrylate are used preferably. These compounds may be used either singly or in any combination thereof.

Specific examples of the styrene monomers include styrene and styrene derivatives such as o-methylstyrene, m-methylstyrene, p-methylstyrene, α-methylstyrene, p-phenylstyrene, p-ethylstyrene, 2,4-dimethylstyrene, p-tert-butylstyrene, p-n-hexylstyrene, p-n-octylstyrene, p-n-nonylstyrene, p-n-decylstyrene and p-n-dodecylstyrene. Of these, styrene is used preferably. These compounds may be used either singly or in any combination thereof.

The ionic leaving group is a substituent such as a carboxyl group, a sulfonic group, or a phosphate group. Specific examples of the polymerizable monomers having such an ionic leaving group include acrylic acid, methacrylic acid, maleic acid, itaconic acid and fumaric acid. Of these, acrylic acid and methacrylic acid are used preferably. These compounds may be used either singly or in any combination thereof.

The content (copolymerization ratio) of the specific vinylfuran structural unit in the specific vinyl copolymer is preferably 30 to 77% by mass.

The content (copolymerization ratio) of the structural unit derived from the polymerizable monomer having an ionic leaving group in the specific vinyl copolymer is preferably 2 to 7% by mass.

If the content of the specific vinylfuran structural unit in the specific vinyl copolymer is too small, a reduction in initial image density may occur. If the content of the specific vinylfuran structural unit in the specific vinyl copolymer is too large, a reduction in uniformity of a halftone image may occur.

Any of a copolymer having the specific vinylfuran structural unit and a structural unit derived from a (meth)acrylate monomer and a copolymer having the specific vinylfuran structural unit, a structural unit derived from a (meth)acrylate monomer, and a structural unit derived from a styrene monomer is particularly preferably used as the specific vinyl copolymer.

The binder resin making up the toner of the present invention may be composed only of the specific vinyl polymer or may be a mixture of the specific vinyl polymer and another resin. However, the content of the specific vinylfuran structural unit in the binder resin is preferably 25 to 100% by mass, more preferably 30 to 77% by mass.

If the content of the specific vinylfuran structural unit in the binder resin is too small, environmental loads may not be sufficiently reduced and suppressed. If the content of the specific vinylfuran structural unit in the binder resin is too large, a reduction in uniformity of a halftone image may occur.

In the binder resin, the ratio of the content of the specific vinyl polymer:the content of the other resin is preferably 77:23 to 30:70.

The glass transition point of the binder resin making up the toner of the present invention is preferably 35 to 70° C., more preferably 45 to 55° C. The softening point of the binder resin is preferably 80 to 110° C., more preferably 90 to 105° C. The peak molecular weight of the binder resin that is obtained from the molecular weight distribution of its styrene equivalent molecular weight measured by gel permeation chromatography (GPC) is preferably 3,500 to 20,000, more preferably 10,000 to 20,000. The peak molecular weight means a molecular weight at the elution time of the top of the peak of the molecular weight distribution. If the molecular weight distribution has a plurality of peaks, the peak molecular weight means a molecular weight at the elution time of the top of a peak having the largest peak area ratio.

The glass transition point of the binder resin making up the toner of the present invention is measured using a differential scanning calorimeter "DSC-7" (manufactured by PerkinElmer Co., Ltd.) and a thermal analyzer controller "TAC7/DX" (manufactured by PerkinElmer Co., Ltd.).

More specifically, 5.00 mg of a measurement sample (binder resin) is sealed in an aluminum-made pan "KITNO, 0219-0041," and the pan is placed in the sample holder of the "DSC-7." An empty aluminum-made pan is used for reference measurement. A heating-cooling-heating cycle is performed in the temperature range of 0 to 200° C. while the temperature is controlled under the measurement conditions of a temperature increase rate of 10° C./min and a temperature decrease rate of 10° C./min. Data in the 2nd heating is acquired, and the intersection of the extension of a base line before the rising edge of a first endothermic peak and a tangential line representing the maximum inclination between the rising edge of the first endothermic peak and the top of the peak is used as the glass transition point. After the first heating, the temperature is held at 200° C. for 5 minutes.

The softening point of the binder resin making up the toner of the present invention is measured as follows.

First, 1.1 g of the binder resin is placed in a petri dish under an environment of 20° C. and 50% RH and then is leveled off. After left to stand for 12 hours or longer, the binder resin is pressurized using a press "SSF-10A" (manufactured by Shimadzu Corporation) at a pressure of 3,820 kg/cm$^2$ for 30 seconds to produce a cylindrical molded sample having a diameter of 1 cm. Then the molded sample is placed in a flow tester "CFT-500D" (manufactured by Shimadzu Corporation) under an environment of 24° C. and 50% RH. Under the conditions of a load of 196 N (20 kgf), a start temperature of 60° C., a preheating time of 300 seconds, and a temperature increase rate of 6° C./min, the molded sample is extruded from the hole (1 mm diameter×1 mm) of a cylindrical die using a piston having a diameter of 1 cm after completion of preheating. An offset method temperature $T_{offset}$ measured by a melting temperature measurement method (temperature rising method) with an offset value being set to 5 mm is used as the softening temperature of the binder resin.

The peak molecular weight of the binder resin making up the toner of the present invention is measured by the gel permeation chromatography (GPC). More specifically, the peak molecular weight is measured using an apparatus "HLC-8220" (manufactured by TOSOH Corporation) and a column "TSK guard column+TSK gel Super HZM-M (three in series)" (manufactured by TOSOH Corporation) in the flow of tatrahydrofuran (THF) used as a carrier solvent at a flow rate of 0.2 ml/min while the temperature of the column is held at 40° C. A measurement sample (binder resin) is dissolved in tetrahydrofuran at a concentration of 1 mg/ml using an ultrasonic dispenser. In this case, the dissolving treatment is performed at room temperature for 5 minutes. Next, the obtained solution is treated through a membrane filter having a pore size of 0.2 μm to obtain a sample solution, and 10 μL of the sample solution together with the above-described carrier solvent is injected into the apparatus. Detection is performed using a refractive index detector (RI detector), and the molecular weight distribution of the measurement sample is calculated using a calibration curve determined using monodispersed polystyrene standard particles. Ten different types of polystyrene were used for the determination of the calibration curve.

Colorant:

When the toner particles according to the present invention contain a colorant, any of the commonly known dyes and pigments can be used as the colorant.

Examples of the colorant used to obtain a black toner include carbon black, magnetic substances, and iron-titanium complex oxide black. Examples of the carbon black include channel black, furnace black, acetylene black, thermal black and lamp black. Examples of the magnetic substances include ferrite and magnetite.

Examples of the colorant used to obtain a yellow toner include dyes such as C.I. Solvent Yellow: 19, 44, 77, 79, 81, 82, 93, 98, 103, 104, 112 and 162; and pigments such as C.I. Pigment Yellow: 14, 17, 74, 93, 94, 138, 155, 180 and 185.

Examples of the colorant used to obtain a magenta toner include dyes such as C.I. Solvent Red: 1, 49, 52, 58, 63, 111 and 122; and pigments such as C.I. Pigment Red: 5, 48:1, 53:1, 57:1, 122, 139, 144, 149, 166, 177, 178 and 222.

Examples of the colorant used to obtain a cyan toner include dyes such as C.I. Solvent Blue: 25, 36, 60, 70, 93 and 95; and pigments such as C.I. Pigment Blue: 1, 7, 15, 60, 62, 66 and 76.

As a colorant for obtaining a toner of each color, colorants for each color may be used singly or in any combination thereof.

The content of the colorant in the toner particles is preferably 0.5 to 20% by mass, more preferably 2 to 10% by mass.

Magnetic Powder:

When the toner particles according to the present invention contain a magnetic powder, any of magnetite, γ-hematite and various types of ferrites, for example, may be used as the magnetic powder.

The content of the magnetic powder is preferably 10 to 500 parts by mass, more preferably 20 to 200 parts by mass per 100 parts by mass of the binder resin.

Parting Agent:

When the toner particles according to the present invention contain a parting agent, no particular limitation is imposed on the parting agent, and any of various publicly-known waxes can be used. The wax used is particularly preferably a polyolefin wax such as a low molecular weight polypropylene or polyethylene wax or an oxidized type polypropylene or polyethylene wax.

The content of the parting agent in the toner particles is preferably 1 to 30% by mass, more preferably 3 to 15% by mass.

Charge Control Agent:

When the toner particles according to the present invention contain a charge control agent, no particular limitation is imposed on the charge control agent, so long as it is a colorless material that can impart positive or negative charge by triboelectrification. Any of various publicly-known charge control agents for positive electrification and charge control agents for negative electrification can be used.

The content of the charge control agent in the toner particles is preferably 0.01 to 30% by mass, more preferably 0.1 to 10% by mass.

In the toner described above, the content of the specific vinylfuran structural unit in the toner particles is preferably 27 to 70% by mass.

When the content of the specific vinylfuran structural unit in the toner particles is 27% by mass or more, the environmental loads can be reduced and suppressed.

Average Particle Size of Toner

The average particle size of the toner is preferably 4 to 10 μm, more preferably 6 to 9 μm, for example, in terms of a volume-based median diameter.

When the volume-based median diameter falls within the above range, transfer efficiency increases, and the quality of a halftone image is improved, resulting in an improvement in the image quality of fine lines and dots.

The volume-based median diameter of the toner is measured and calculated using a measuring device composed of "Coulter Muitisizer 3" (manufactured by Beckman Coulter, Inc.) and a computer system connected thereto and equipped with data processing software "Software V3.51."

Specifically, 0.02 g of a toner is added to 20 mL of a surfactant solution (for example, a surfactant solution obtained by diluting a neutral detergent containing a surfactant component with pure water to 10 times for the purpose of dispersing the toner particles) to cause the toner to be intimate, and then ultrasonic dispersion is performed for 1 minute to prepare a dispersion of the toner. This toner dispersion is added with a pipette to a beaker containing "ISOTON II" (manufactured by Beckman Coulter, Inc.) and held in a sample stand until the concentration displayed in the measuring device reaches 8%.

By using the above concentration range, a reproducible measurement value can be obtained. In the measuring device, the number of particles to be counted is set to 25,000, and the diameter of an aperture is set to 50 μm. The range of measurement (1 to 30 μm) is divided into 256 sections, and a frequency value in each section is calculated. The particle size when a cumulative volume fraction cumulated from the largest volume fraction is 50% is used as the volume-based median diameter.

The coefficient of variation (CV value) of the particle size distribution of the toner is preferably 0 to 25%, more preferably 5 to 20%. When the coefficient of variation fails within the above range, the uniformity of the electrification characteristics of the toner is improved, and images formed have high gray scale reproducibility.

The coefficient of variation is determined by the following equation (x).

$$\text{Coefficient of variation (\%)} = \{(\text{standard deviation})/(\text{arithmetic mean particle size})\} \times 100 \quad \text{Equation (x):}$$

Here, the arithmetic mean particle size is a mean value of volume-based diameters x of 25,000 toner particles.

Shape Factor of Toner Particles:

In the toner of the invention, each of the toner particles constituting the toner has a shape factor of preferably 0.930 to 1.000, more preferably 0.950 to 0.995, in terms of improving transfer efficiency. The shape factor is represented by the following equation (SF).

$$\text{Shape factor} = \{(\text{maximum diameter of toner particle})^2/(\text{projected area})\} \times (\pi/4) \quad \text{Equation (SF):}$$

Here, the maximum diameter of a toner particle means the maximum width of an image of the toner particle projected onto a plane, i.e., the maximum distance between two parallel lines sandwiching the projected image thereof. The projected area means the area of the image of the toner particle projected onto a plane.

The above-described toner comprises the toner particles including the binder resin containing the specific vinyl polymer having the specific vinylfuran structural unit. Since the specific vinylfuran structural unit can be obtained from a raw material derived from a plant, as described above, the environmental loads can be reduced and suppressed.

In the above-described toner, the binder resin making up the toner particles includes the specific vinylfuran structural unit. Therefore, high electrification stability is obtained, and high transfer properties are obtained. Therefore, image stability when a large number of sheets are printed is high.

This may be because of the following reason. The binder resin making up the toner particles includes the specific vinylfuran structural unit. An oxygen atom in a furanyl group contained in the specific vinylfuran structural unit has $sp^2$ hybridized orbitals as in carbon atoms in the furanyl group, and the structural part of the furanyl group has a dipolar resonance hybrid structure, so that the electrification rise time of the toner is shortened. This may suppress excessive electrification during long-term stirring and a change in image density caused by the excessive electrification.

In the above-described toner, the binder resin making up the toner particles includes the specific vinylfuran structural unit. Therefore, high fixability at a fold can be obtained.

This may be because of the following reason. The main component of a conventional toner using a styrene-acrylic resin as a binder resin is styrene having relatively high hydrophobicity, and therefore, a sufficient adhesive strength cannot be obtained between the structural unit derived from the styrene in the resin and an image supporting material (paper) having a hydrophilic group on its surface. However, with the above-described toner comprising the binder resin including the specific vinylfuran structural unit, a hydrogen bond is formed between the furanyl group in the specific vinylfuran structural unit and a hydroxy group present on the surface of an image supporting material (paper), and a high adhesion strength is thereby obtained. Therefore, high fixability at a fold can be obtained.

Production Process of Toner:

No particular limitation is imposed on a process of producing the toner of the present invention. Examples of the process include a kneading-pulverizing process, a suspension polymerization process, an emulsion aggregation process, an emulsion polymerization aggregation process, a miniemulsion polymerization aggregation process and other publicly-known processes. Particularly, from the viewpoint of reducing energy cost during production, it is preferable to use an emulsion polymerization aggregation process, wherein emulsion polymerization or mini emulsion polymerization is performed in an aqueous medium using the specific vinylfuran monomer to prepare fine particles composed of a binder resin containing a vinyl polymer having the specific vinylfuran structural unit (these particles may hereinafter be referred to as "fine binder resin particles"), and then the fine binder resin particles and, if necessary, fine particles of other toner particle forming components are aggregated and fused. A toner production process using a suspension polymerization process and disclosed in Japanese Patent Application Laid-Open No. 2010-191043 can also be preferably used.

In the emulsion polymerization aggregation process, the fine binder resin particles may have a structure composed of two or more layers of different binder resins having different compositions. In this case, a multi-stage polymerization process may be adopted. In this multi-stage polymerization process, a polymerization initiator and a polymerizable monomer are added to a dispersion of first fine resin particles prepared by an emulsion polymerization treatment (first-stage polymerization) according to a method known per se in the art, and the prepared system is subjected to a polymerization treatment (second-stage polymerization).

A specific example of the production process used when the toner of the present invention is obtained by the emulsion polymerization aggregation process is shown below. The production process includes:

(1A) a fine binder resin particle polymerizing step of activating a radical polymerization initiator in an aqueous medium with a polymerizable monomer that forms a binder resin to thereby obtain fine binder resin particles.

(1B) a fine colorant particle dispersion-preparing step of optionally preparing a dispersion of fine particles of a colorant (which hereinafter may be referred to as "fine colorant particles") if necessary;

(2) an association step of forming associated particles by adding an aggregating agent to the aqueous medium containing the fine binder resin particles and the fine colorant particles to allow salting-out to proceed and the fine particles to be aggregated and fused;

(3) an aging step of forming a toner by controlling the shape of the associated particles;

(4) a filtrating and washing step of separating the toner particles from the aqueous medium by filtration and removing a surfactant etc. from the toner particles;

(5) a drying step of drying the washed toner particles; and (6) an external additive adding step of adding external additives to the dried toner particles.

Here, the term "aqueous medium" means a medium composed of 50 to 100% by mass of water and 0 to 50% by mass of a water-soluble organic solvent. As examples of the water-soluble organic solvent, may be mentioned methanol, ethanol, isopropanol, butanol, acetone, methyl ethyl ketone and tetrahydrofuran. An alcohol-based organic solvent, such as methanol, ethanol, isopropanol or butanol, that does not dissolve the obtained resin is preferred.

As examples of a method of introducing the parting agent into the toner particles, may be mentioned a method in which fine binder resin particles containing the parting agent are formed and a method in which a dispersion obtained by dispersing fine parting agent particles in an aqueous medium is added in the association step of forming the toner particles and then the fine binder resin particles, the fine colorant particles, and the fine parting agent particles are subjected to salting-out, aggregation, and fusion. These methods may be combined.

As examples of a method of introducing the charge control agent into the toner particles, may be mentioned methods similar to the above-described methods of introducing the parting agent into the toner particles.

(1A) Fine Binder Resin Particle Polymerizing Step:

Specifically, in the fine binder resin particle polymerizing step, for example, the specific vinylfuran monomer and, if necessary, another desired polymerizable monomer are added to an aqueous medium and dispersed therein by applying mechanical energy to form oil droplets. In this state, the polymerizable monomers are subjected to a radical polymerization reaction to form fine binder resin particles composed of the specific vinyl polymer and having a size of about 50 to about 300 nm, for example, in terms of a volume-based median diameter.

No particular limitation is imposed on a dispersing device used to apply the mechanical energy for the formation of oil droplets. Representative examples of the dispersing device include a commercially available stirring device "CLEARMIX" (manufactured by M Technique Co., Ltd.) equipped with a rotor rotatable at high speed. In addition to the above-described stirring device equipped with a rotor rotatable at high speed, any of a device such as an ultrasonic dispersing device, a mechanical homogenizer, a Manton-Gaulin homogenizer and a pressure-type homogenizer can be used.

The temperature during the radical polymerization reaction depends on the types of the polymerizable monomers used and the type of the radical polymerization initiator and is preferably, for example, 50 to 100° C., more preferably 55 to 90° C. The time required for the radical polymerization reaction depends on the types of the polymerizable monomers used and the reaction rate of the radicals from the radical polymerization initiator and is preferably, for example, 2 to 12 hours.

Surfactant:

In the fine binder resin particle polymerizing step, a suitable dispersion stabilizer may be added to stably disperse the fine particles in the aqueous medium.

As examples of the dispersion stabiliser, may be mentioned tricalcium phosphate, magnesium phosphate, zinc phosphate, aluminum phosphate, calcium carbonate, magnesium carbonate, calcium hydroxide, magnesium hydroxide, aluminum hydroxide, calcium metasilicate, calcium sulfate, barium sulfate, bentonite, silica and alumina. Any of the commonly used surfactants such as polyvinyl alcohol, gelatin, methylcellulose, sodium dodecylbenzene sulfonate, ethylene oxide adducts and sodium higher alcohol sulfates can also be used as the dispersion stabilizer.

Any of various publicly-known conventional ionic surfactants and nonionic surfactants can be used as the surfactant.

Examples of the ionic surfactants include: sulfonates such as sodium dodecylbenzene sulfonate, sodium arylalkylpolyether sulfonates, sodium 3,3-disulfonediphenylurea-4,4-diazo-bis-amino-8-naphthol-6-sulfonate, o-carboxybenzene-azo-dimethylaniline, and sodium 2,2,5,5-tetramethyl-triphenylmethane-4,4-diazo-bis-β-naphthol-6-sulfonate; sulfates such as sodium dodecylsulfate, sodium tetradecylsulfate, sodium pentadecylsulfate, and sodium octylsulfate; and fatty acid salts such as sodium oleate, sodium laurate, sodium caprate, sodium caprylate, sodium caproate, potassium stearate, and calcium oleats.

Examples of the nonionic surfactants include polyethylene oxide, polypropylene oxide, a combination of polyethylene oxide and polypropylene oxide, higher fatty acid esters of polyethylene glycol, alkylphenol polyethylene oxides, higher fatty acid esters of polypropylene oxide, and sorbitan esters.

Polymerization Initiator:

Any suitable oil-soluble or water-soluble polymerization initiator may be used as the polymerization initiator in the fine binder resin particle polymerizing step.

Specific examples of the oil-soluble polymerization initiator include:

(1) azo-based and diazo-based polymerization initiators such as 2,2'-azobis- (2,4-dimethylvaleronitrile), 2,2'-azobisisobutyronitrile, 1,1'-azobis(cyclohexane-1-carbonitrile), 2,2'-azobis-4-methoxy-2,4-dimethylvaleronitrile and azobisisobutyronitrile; and (2) peroxide-based polymerization initiators such as benzoyl peroxide, methyl ethyl ketone peroxide, diisopropyl peroxycarbonate, cumene hydroperoxide, t-butyl hydroperoxide, di-t-butyl peroxide, dicumyl peroxide, 2,4-dichlorobenzoyl peroxide, lauroyl peroxide, 2,2-bis- (4,4-t-butylperoxycyclohexyl)propane and tris-(t-butylperoxy) triazine.

Specific examples of the water-soluble polymerization initiators include: persulfates such as potassium persulfate and ammonium persulfate; azobisaminodipropane acetate; azobiscyanovaleric acid and salts thereof; and hydrogen peroxide.

Chain Transfer Agent:

In the fine binder resin particle polymerizing step, any commonly used chain transfer agent can be used for the purpose of controlling the molecular weight of the binder resin. No particular limitation is imposed on the chain transfer agent, and examples thereof include n-octyl mercaptan, dodecyl mercaptan, tert-dodecyl mercaptan, n-octyl-3-mercapto propionate, terpinolene, carbon tetrabromide and an α-methylstyrene dimer.

(1B) Fine Colorant Particle Dispersion Preparing Step:

The fine colorant particle dispersion preparing step is optionally performed when toner particles containing a colorant are desired. In this step, the colorant is dispersed as fine particles in an aqueous medium to prepare a dispersion of the fine colorant particles.

The colorant can be dispersed using mechanical energy.

The dispersed fine colorant particles have a volume-based median diameter of preferably 10 to 300 nm, more preferably 100 to 200 nm, particularly preferably 100 to 150 nm.

The volume-based median diameter of the fine colorant particles is measured using an electrophoretic light-scattering photometer "ELS-800" (manufactured by Otsuka Electronics Co., Ltd.).

The association step (2) to the external additive adding step (6) can be performed according to any of various publicly-known conventional methods.

Aggregating Agent:

No particular limitation is imposed on the aggregating agent used in the association step, but an aggregating agent selected from metal salts is preferably used.

As examples of the metal salts, may be mentioned monovalent metal salts such as salts of alkali metals including sodium, potassium, lithium and the like; salts of divalent metals such as calcium, magnesium, manganese and copper; and salts of trivalent metals such as iron and aluminum. Specific examples of the metal salts include sodium chloride, potassium chloride, lithium chloride, calcium chloride, magnesium chloride, zinc chloride, copper sulfate, magnesium sulfate and manganese sulfate. Of these, divalent metal salts are particularly preferably used because such a divalent metal salt can promote aggregation in a smaller amount. These compounds may be used either singly or in any combination thereof.

External Additives

The above-described toner particles can form the toner of the present invention as they are. However, to improve flowability, electrification characteristics, cleaning ability, etc, external additives such as a flowability improver and a cleaning aid, which are so-called post treatment agents, may be added to the toner particles when the toner of the present invention is formed.

Examples of the external additives include: fine inorganic oxide particles such as fine silica particles, fine alumina particles and fine titanium oxide particles; fine inorganic stearate compound particles such as fine aluminum stearate particles and fine zinc stearate particles; and fine inorganic titanate compound particles such as strontium titanate and zinc titanate. These compounds may be used either singly or in any combination thereof.

Preferably, these fine inorganic particles have been subjected to a surface treatment with a silane coupling agent, a titanium coupling agent, a higher fatty acid, or silicone oil, in order to improve heat resistant storage properties and to improve environmental stability.

The total content of these various external additives is preferably 0.05 to 5 parts by mass, preferably 0.1 to 3 parts by mass per 100 parts by mass of the toner. A combination or various external additives may also be used.

Developer:

The toner of the present invention may be used as a magnetic or non-magnetic one-component developer, but may also be mixed with a carrier to be used as a two-component developer.

When the toner is used as a two-component developer, the amount of the toner mixed with the carrier is preferably 2 to 10% by mass.

No particular limitation is imposed on a mixer used to mix the toner and the carrier, and examples of the mixer include a nauta mixer and W-cone and V-type mixers.

Magnetic particles composed of a publicly-known material such as a metal of iron, an iron compound such as ferrite, magnetite and the like or an alloy of the metal and another metal such as aluminum or lead can be used as the carrier. Ferrite particles are particularly preferred.

In addition, any of a coated carrier obtained by coating the surface of magnetic particles with a coating such as a resin and a binder-type carrier obtained by dispersing fine magnetic particles in a binder resin can be used as the carrier.

No particular limitation is imposed on the coating resin used to form the coated carrier, and examples of the coating resin include olefin resins, styrene resins, styrene-acrylic resins, silicone resins, ester resins and fluorocarbon resins. No particular limitation is imposed on the resin that forms the resin dispersion-type carrier, and any publicly-known resin can be used. For example, any of styrene-acrylic resins, polyester resins, fluorocarbon resins and phenolic resins can be used.

The volume-based median diameter of the carrier is preferably 20 to 100 μm, more preferably 20 to 60 μm. The volume-based median diameter of the carrier can be measured typically with a laser diffraction-type particle size distribution measuring device "HELOS" (manufactured by SYMPATEC Corp.) equipped with a wet dispersing device.

Image Forming Method:

The toner of the present invention can be used in commonly used image forming methods of an electrophotographic system.

Image Supporting Material:

Specific examples of the image supporting material used in an image forming method using the toner of the present invention include, but not limited to: various types of printing paper such as thin ordinary plain paper, thick ordinary plain paper, high-quality paper, coated printing paper (for example, art paper and coated paper), commercially available Japanese paper and commercially available postcard paper.

The embodiments of the present invention have been specifically described. However, the embodiments of the present invention are not limited to those described above, and various modifications can be made thereto.

EXAMPLES

Specific examples of the present invention will next be described, but the invention is not limited thereto.

Polymerization Example 1 of Specific Vinyl Polymer

To 724.71 g of vinylfuran (VF), 295.87 g of n-butyl acrylate, 38.66 g of methacrylic acid and 8.84 g of n-octylmercaptan, 115.85 g of behenyl behenate was added, and the mixture was dissolved under heating to prepare a monomer solution.

An aqueous solution obtained by dissolving 1.93 g of sodium dodecylsulfate in 3,336.8 g of pure water was heated to 80° C., and the above monomer solution was added thereto. The resultant mixture was stirred at high speed to prepare a monomer emulsion.

The monomer emulsion was placed in a polymerization tank equipped with a stirrer, a condenser tube, a nitrogen introduction tube, and a thermometer. While the monomer emulsion was stirred, nitrogen was introduced into the polymerization tank, and the internal temperature of the polymerization tank was maintained at 80° C. With this state being maintained, an aqueous polymerization initiator solution prepared by dissolving 9.92 g of potassium persulfate in 188.5 g of pure water was added, and a polymerization reaction was performed in a nitrogen flow at 80° C. for 6 hours under stirring. The resultant mixture was cooled to room temperature. Then the contents of the polymerization tank were filtrated, and fine binder resin particles 1 were thereby obtained.

Polymerization Example 2 of Specific Vinyl Polymer

Fine binder resin particles [2] were obtained in the same manner as in Polymerization Example 1 of the specific vinyl polymer, except that "724.71 g of hydroxymethylvinylfuran (HMVF)" was used instead of "724.71 g of vinylfuran."

Polymerization Example 3 of Specific Vinyl Polymer

Fine binder resin particles [3] were obtained in the same manner as in Polymerization Example 1 of the specific vinyl polymer, except that "724.71 g of methoxymethylvinyl furan (MMVF), 305.6 g of n-butyl acrylate and 41.9 g of methacrylic acid" were used instead of "724.71 g of vinylfuran, 295.87 g of n-butyl acrylate and 38.66 g of methacrylic acid."

Polymerization Example 4 of Specific Vinyl Polymer

Fine binder resin particles [4] were obtained in the same manner as in Polymerization Example 1 of the specific vinyl polymer, except that "357.36 g of methoxymethylvinylfuran (MMVF), 357.35 g of styrene, 305.6 g of n-butyl acrylate and 41.9 g of methacrylic acid" were used instead of "724.71 g of vinylfuran, 295.87 g of n-butyl acrylate and 38.66 g of methacrylic acid."

Polymerization Example 5 of Specific Vinyl Polymer

Fine binder resin particles [5] were obtained in the same manner as in Polymerization Example 1 of the specific vinyl polymer, except, that "724.71 g of ethoxymethylvinylfuran (EMVF), 305.6 g of n-butyl acrylate and 41.9 g of methacrylic acid" were used instead of "724.71 g of vinylfuran, 295.87 g of n-butyl acrylate and 38.66 g of methacrylic acid."

Polymerization Example 6 of Specific Vinyl Polymer

Fine binder resin particles [6] were obtained in the same manner as in Polymerization Example 1 of the specific vinyl polymer, except that "724.71 g of butoxymethylvinylfuran (BMVF), 305.6 g of n-butyl acrylate and 41.9 g of methacrylic acid" were used instead of "724.71 g of vinylfuran, 295.87 g of n-butyl acrylate and 38.66 g of methacrylic acid."

Polymerization Example 7 of Specific Vinyl Polymer

Fine binder resin particles [7] were obtained in the same manner as in Polymerization Example 1 of the specific vinyl polymer, except that "724.71 g of octoxymethylvinylfuran (OMVF), 305.6 g of n-butyl acrylate and 41.9 g of methacrylic acid" were used instead of "724.71 g of vinylfuran, 295.87 g of n-butyl acrylate and 38.66 g of methacrylic acid."

Polymerization Example 8 of Specific Vinyl Polymer

Fine binder resin particles [3] were obtained in the same manner as in Polymerization Example 1 of the specific vinyl polymer, except that "724.1 g of acetoxymethylvinylfuran (AMVF), 305.6 g of n-butyl acrylate and 41.9 g of methacrylic acid" were used instead of "724.71 g of vinylfuran, 295.87 g of n-butyl acrylate and 38.66 g of methacrylic acid."

Polymerization Example 9 of Specific Vinyl Polymer

To 362.36 g of styrene, 149.94 g of n-butyl acrylate, 19.33 g of methacrylic acid and 4.42 g of n-octyl mercaptan, 115.85 g of behenyl behenate was added, and the mixture was dissolved under heating to prepare a monomer solution.

An aqueous solution obtained by dissolving 1.93 g of sodium dodecylsulfate in 3,336.8 g of pure water was heated to 80° C., and the above monomer solution was added thereto. The resultant mixture was stirred at high speed to prepare a monomer emulsion.

The monomer emulsion was placed in a polymerization tank equipped with a stirrer, a condenser tube, a nitrogen introduction tube, and a thermometer. While the monomer emulsion was stirred, nitrogen was introduced into the polymerization tank, and the internal temperature of the polymerization tank was maintained at 80° C. With this state being maintained, an aqueous polymerization initiator solution prepared by dissolving 4.96 g of potassium persulfate in 94.3 g of pure water was added, and a polymerization reaction was performed in a nitrogen flow at 80° C. for 4 hours under stirring. Then an aqueous polymerization initiator solution prepared by dissolving 4.96 g of potassium persulfate in 94.3 g of pure water was added, and a monomer solution containing 265.20 g of methoxymethylvinylfuran, 169.27 g of n-butyl acrylate, and 4.42 g of n-octyl mercaptan was added dropwise to the resultant mixture over 1 hour. The mixture was further subjected to polymerization at 80° C. for 3 hours, and then the resultant mixture was cooled to room temperature. The contents of the polymerization tank were filtrated, and fine binder resin particles [9] were thereby obtained.

Polymerization Example 10 of Specific Vinyl Polymer

Fine binder resin particles [10] were obtained in the same manner as in Polymerization Example 1 of the specific vinyl polymer, except that "848.3 g of methoxymethylvinylfuran (MMVF), 265.46 g of n-butyl acrylate and 8.2 g of methacrylic acid" were used instead of "724.71 g of vinylfuran, 295.87 g of n-butyl acrylate and 38.66 g of methacrylic acid."

Polymerization Example 11 of Specific Vinyl Polymer

Fine binder resin particles [11] were obtained in the same manner as in Polymerization Example 1 of the specific vinyl polymer, except that "986.47 g of methoxymethylvinylfuran (MMVF), 265.46 g of n-butyl acrylate and 8.2 g of methacrylic acid" were used instead of "724.71 g of vinylfuran 295.87 g of n-butyl acrylate and 38.66 g of methacrylic acid."

Example 1

Production Example 1 of Toner

First, 4.7 g of a cyan pigment (Pigment Blue 15:3) was gradually added under stirring to a solution obtained by dissolving 1.65 g of a surfactant "DOWFAX (registered trademark) 2A-1" (manufactured by The Dow Chemical Company) in 31.25 g of pure water to prepare a fine colorant particle dispersion [Cy].

Next, 79.1 g of the fine binder resin particles [1] (in terms of solid content), 37.60 g of the fine colorant particle dispersion [Cy], an aqueous surfactant solution obtained by dissolving 0.2 g of a surfactant "EMAL E-27C (effective component: 27%)" (manufactured by Kao Corporation) in 4.9 g of pare water were mixed with 120.41 g of pure water. The pH of the mixture was adjusted to 10 with a 0.5N aqueous sodium hydroxide solution, and the resultant mixture was placed in a reaction tank equipped with a stirrer, a thermometer, and a condenser tube and stirred therein. Then an aqueous magnesium chloride solution prepared by dissolving 20.9 g of magnesium chloride hexahydrate in 13.64 g of pure water was gradually added dropwise under stirring. Under stirring, the internal temperature of the reaction tank was increased to 85° C.

With the temperature being maintained at 85° C. the solution in the reaction tank was sampled under stirring, and the diameter of the particles was measured using "Coulter Multisizer 3". When the volume-based median diameter reached 6.50 μm, an aqueous sodium chloride solution prepared by dissolving 64.25 g of sodium chloride in 255.99 g of pure water was added, and the resultant mixture was maintained at 85° C. under stirring. Then, while the size of the particles was measured to confirm that the particle size was being unchanged, the shape factor of the particles were measured using a flow-type particle image analyser "FIPA-2100" (manufactured by SYSMSX Corporation). When the shape factor reached 0.965, the reaction mixture was cooled to room temperature, filtrated, repeatedly washed, and then dried to produce toner particles [1X].

To the toner particles [1X], 1% by mass of hydrophobic silica (number average primary particle size=12 mm) and 0.3% by mass of hydrophobic titania (number average primary particle size=20 nm) were added. The mixture was mixed in a Henschel mixer to perform an external additive treatment, and a toner [1] was thereby obtained.

The volume-based median diameter of the toner [1] was 6.53 μm, the coefficient of variation was 18.9%, and the shape factor was 0.966.

Example 2

Production Example 2 of Toner

A toner [2] was obtained in the same manner as in Production Example 1 of the toner, except that the fine binder resin particles [2] were used instead of the fine binder resin particles [1].

The volume-based median diameter of the toner [2] was 6.61 μm, the coefficient of variation was 19.6%, and the shape factor was 0.958.

Example 3

Production Example 3 of Toner

A toner [3] was obtained in the same manner as in Production Example 1 of the toner, except that the fine binder resin particles [3] were used instead of the fine binder resin particles [1].

The volume-based median diameter of the toner [3] was 6.38 μm, the coefficient of variation was 20.6%, and the shape factor was 0.967.

Example 4

Production Example 4 of Toner

A toner [4] was obtained in the same manner as in Production Example 1 of the toner, except that the fine binder resin particles [4] were used instead of the fine binder resin particles [1].

The volume-based median diameter of the toner [4] was 6.27 μm, the coefficient of variation was 19.4%, and the shape factor was 0.971.

Example 5

Production Example 5 of Toner

A toner [5] was obtained in the same manner as in Production Example 1 of the toner, except that, the fine binder resin particles [5] were used instead of the fine binder resin particles [1].

The volume-based median diameter of the toner [5] was 6.42 μm, the coefficient of variation was 18.9%, and the shape factor was 0.963.

Example 6

Production Example 6 of Toner

A toner [6] was obtained in the same manner as in Production Example 1 of the toner, except that the fine binder resin particles [6] were used instead of the fine binder resin particles [1].

The volume-based median diameter of the toner [6] was 6.72 μm, the coefficient of variation was 18.5%, and the shape factor was 0.966.

Example 7

Production Example 7 of Toner

A toner [7] was obtained in the same manner as in Production Example 1 of the toner, except that the fine binder resin particles [7] were used instead of the fine binder resin particles [1].

The volume-based median diameter of the toner [7] was 6.53 μm, the coefficient of variation was 18.8%, and the shape factor was 0.962.

Example 8

Production Example 8 of Toner

A toner [8] was obtained in the same manner as in Production Example 1 of the toner, except that the fine binder resin particles [8] were used instead of the fine binder resin particles [1].

The volume-based median diameter of the toner [8] was 6.61 μm, the coefficient of variation was 19.5%, and the shape factor was 0.964.

Example 9

Production Example 9 of Toner

A toner [9] was obtained in the same manner as in Production Example 1 of the toner, except that the fine binder resin particles [9] were used instead of the fine binder resin particles [1].

The volume-based median diameter of the toner [9] was 6.18 μm, the coefficient of variation was 20.8%, and the shape factor was 0.974.

Example 10

Production Example 10 of Toner

A toner [10] was obtained in the same manner as in Production Example 1 of the toner, except that the fine binder resin particles [10] were used instead of the fine binder resin particles [1].

The volume-based median diameter of the toner [10] was 6.18 μm, the coefficient of variation was 19.4%, and the shape factor was 0967.

Example 11

Production Example 11 of Toner

A toner [11] was obtained in the same manner as in Production Example 1 of the toner, except that the fine binder resin particles [11] were used instead of the fine binder resin particles [1].

The volume-based median diameter of the toner [11] was 6.18 μm, the coefficient of variation was 19.9%, and the shape factor was 0.961.

Production Example 12 of Toner

A polymerizable monomer composition composed of 72 g of methoxymethylvinylfuran, 18 g of butyl acrylate, 10 g of a polyester resin (a condensation product of terephthalic acid and a 2 mole ethylene oxide adduct of bisphenol A, peak molecular weight: 5,000), 6.2 g of C.I. Pigment Red 122 (pigment) and 5.5 g of behenyl behenate was added to an aqueous medium containing $Ca_3(PO_4)_2$, and the mixture was heated to 60° C. and uniformly dispersed using a TK-type homomixer (manufactured by Tokushu Kika Kogyo Co., Ltd,) at 12,000 rpm. Then 10 g of a polymerization initiator, 2, 2'-azobis(2,4-dimethylvalaronitrile), was added to the mixture, and the resultant mixture was subjected to suspension and dispersion. The suspension subjected to suspension and dispersion was allowed to react. After completion of the reaction, the suspension was cooled, and hydrochloric acid was added to dissolve $Ca_3(PO_4)_2$. The resultant mixture was filtrated, washed with water, dried, and then subjected to an external additive treatment as in Production Example 1 of the toner, whereby a toner [12] having a volume-based median diameter of 6.5 μm was obtained.

Production Example 13 of Toner (1) Preparation of Oil Phase:

An oil phase composed of 100 parts by mass of the fine binder resin particles [1], 50 parts by mass of a polyester resin (a condensation product of fumaric acid and a 2 mole propylene oxide adduct of bisphenol A, peak molecular weight: 7,500), 10 parts by mass of C.I. Solvent Red 49, 33 parts by mass of paraffin wax (melting point: 97° C.) and 1,032 parts by mass of ethyl acetate was prepared. After it was confirmed that the fine binder resin particles [1] and the polyester resin could sufficiently be dissolved in the oil phase, the mixture was placed in a homomixer "ACE homogenizer" (manufactured by NIHONSEIKI KAISHA Ltd.) and stirred at 15,000 rpm for 2 minutes to prepare a uniform oil phase [I].

(2) Preparation of Aqueous Phase:

A dispersion of calcium carbonate was prepared by stirring 60 parts by mass of calcium carbonate (average particle diameter: 0.03 μm) and 40 parts by mass of pure water using a ball mill for 4 days.

(3) Production of Toner:

Sixty parts by mass of the oil phase [I] and 10 parts by mass of the calcium carbonate dispersion as above were placed in a colloid mill (manufactured by NIHONSEIKI KAISHA Ltd.) and subjected to emulsification at a gap of 1.5 mm and 8,000 rpm for 20 minutes. The obtained emulsion was placed in a rotary evaporator and the used solvent was removed at room temperature under a reduced pressure of 30 mmHg for 3 hours. Then 12N hydrochloric acid was added until the pH of the emulsion became 2 to remove calcium carbonate from the surfaces of the toner particles. Then 10N sodium hydroxide was added until the pH became 10, and the emulsion was stirred using a stirrer in an ultrasonic cleaning tank for 1 hour. The resultant emulsion was subjected to centrifugal sedimentation, and the supernatant was replaced three times for washing. The product was dried and then subjected to an external additive treatment as in Production Example 1 of the toner to obtain a toner [13] having a volume-based median diameter of 7,8 μm.

Production Examples 1 to 13 of Developer

A horizontal stirring vane-type high-speed stirrer was charged with 100 parts by mass of ferrite particles (manufactured by Powdertech Co., Ltd., volume-based median diameter: 50 μm) and 4 parts by mass of a methyl mathacrylate-cyclohexyl methacrylate copolymer resin (volume-based median diameter of primary particles: 85 nm), and the mixture was mixed under the conditions of a stirring vane peripheral speed of 8 m/s and a temperature of 30° C. for 15 minutes. Then the temperature of the mixture was increased to 120° C., and the mixture was further stirred for 4 hours. The resultant mixture was cooled, and the fragments of the methyl methacrylate-cyclohexyl methacrylate copolymer resin were removed using a 200 mesh sieve to produce a resin-coated carrier.

The resin-coated carrier was mixed with each of the above toners [1] to [13] to provide a toner concentration of 7% by mass, thereby preparing developers [1] to [13].

The above-produced developers [1] to [11] were placed one-by-one in a cyan developing unit of a commercially available color multifunction printer "bizhub PRO C6500" (manufactured by Xonica Minolta Business Technologies, Inc.), and the following evaluation was performed. "CF paper (A4, 80 g/m$^2$)" (manufactured by Konica Minolta Business Solutions Japan Co., Ltd.) was used as an image supporting material (evaluation paper). The above-produced developers [12] and [13] were placed one-by-one in a magenta developing unit and evaluated.

(1) Uniformity of Halftone Images:

Ten thousand sheets with halftone images entirely formed of cyan dots (or magenta dots) at a density of 0.5 were continuously outputted in a printer mode in a high-temperature and high-humidity environment (temperature: 30° C., humidity: 80% RH), and the smoothness of each of the first halftone image and the 10,000th halftone image was visually evaluated according to the following evaluation criteria. Symbol A to C are passing grades, The results are shown in Table 1.

Evaluation Criteria:

A: a smooth and uniform halftone image was reproduced.

B: Although irregularities on edges of dots were almost visually unrecognizable, they are recognizable when the image was observed under a magnifying lens.

C: Slight irregularities, i.e., image roughness, were observed by naked eyes, but the degree of the irregularities was permissible.

D: Roughness was observable with naked eyes, and irregularities were visually recognizable.

(2) Image Density:

Ten thousand sheets with solid-filled 5-cm square images printed with a constant amount of toner adhering thereto were continuously outputted in a room temperature and low-humidity environment (temperature: 20° C., humidity: 2% RH). The density of the solid image on each of the first and 10,000th sheets was measured using a transmission densitometer "TD904" (manufactured by Macbeth) and evaluated. Image densities of 1.20 or higher were set to be passing grades. The results are shown in Table 1.

TABLE 1

| | | Binder Resin | | | Toner | Evaluation Results | | | |
| | | Specific Vinyl Polymer | | | Content Of | Uniformity Of | | | |
| | | | Copolymerization | | Blend | VF | Halftone Image | | Image Density | |
| | Toner No. | Type of VF Monomer | Ratio of VF Monomer (%) | Blend Ratio | Ratio of FEs Resin | Structural Unit (%) | First Sheet | 10,000th Sheet | First Sheet | 10,000th Sheet |
|---|---|---|---|---|---|---|---|---|---|---|
| Example 1 | 1 | VF | 68.4 | 100% | 0% | 61.7 | A | A | 1.33 | 1.27 |
| Example 2 | 2 | HMVF | 68.4 | 100% | 0% | 61.7 | A | B | 1.27 | 1.24 |
| Example 3 | 3 | MMVF | 68.4 | 100% | 0% | 61 | A | A | 1.34 | 1.33 |
| Example 4 | 4 | MMVF | 33.7 | 100% | 0% | 30.3 | A | B | 1.35 | 1.32 |
| Example 5 | 5 | BMVF | 67.6 | 100% | 0% | 61 | A | A | 1.31 | 1.24 |
| Example 6 | 6 | BMVF | 67.6 | 100% | 0% | 61 | A | B | 1.31 | 1.28 |
| Example 7 | 7 | OMVF | 67.6 | 100% | 0% | 61 | A | B | 1.29 | 1.26 |
| Example 8 | 8 | AMVF | 67.6 | 100% | 0% | 61 | A | A | 1.31 | 1.27 |
| Example 9 | 9 | MMVF | 27.5 | 44.4% | 0% | 24.5 | A | B | 1.29 | 1.24 |
| Example 10 | 10 | MMVF | 75.6 | 100% | 0% | 68.5 | A | B | 1.32 | 1.29 |
| Example 11 | 11 | MMVF | 78.3 | 100% | 0% | 71.7 | B | B | 1.30 | 1.24 |
| Example 12 | 12 | MMVF | 72 | 100% | 10% | 68.2 | A | A | 1.33 | 1.30 |
| Example 13 | 13 | MMVF | 45.6 | 100% | 33.3% | 37.4 | A | A | 1.35 | 1.30 |

*VF Monomer: Specific Vinylfuran Monomer
*VF Structural Unit: Specific Vinylfuran Structural Unit In Table 1 above, the ratio of copolymerization of a VF monomer was calculated by {(mass of specific vinylfuran monomer (VF monomer))/(total mass of monomers used to form specific vinyl polymer+mass of chain transfer agent)}×100.

The content of a VF structural unit in a toner was calculated by {(mass of specific vinylfuran monomer)/(mass of binder resin+mass of parting agent (behenyl behanate)+mass of colorant)}×100.

The blend ratio of a specific vinyl polymer was calculated by {(mass of specific vinylfuran monomer)/(mass of specific vinyl polymer+mass of other vinyl-based copolymers)}×100.

The blend ratio of a polyester resin was calculated by {(mass of polyester resin)/(mass of specific vinyl polymer+mass of polyester resin)}×100.

As is clear from Table 1, the toner of the present invention contains a binder resin having a specific vinylfuran structural unit, but it was found that the toner can be used for image formation. It was also found that the toner of the present invention can provide high image stability.

The invention claimed is:

1. A toner for electrostatic image development, the toner comprising toner particles containing a resin, wherein
the resin contains a vinyl polymer having a structural unit represented by the following general formula (1):

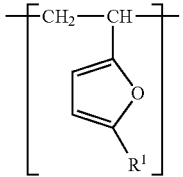

General formula (1)

[in the general formula (1), $R^1$ is a hydrogen atom, —$CH_2OH$, —$CH_2OR^2$, or —$CH_2O(C=O)R^3$, and $R^2$ and $R^3$ are each an alkyl group having 1 to 8 carbon atoms].

2. The toner for electrostatic image development according to claim 1, wherein the vinyl polymer is one selected from the group consisting of a polyvinylfuran (co)polymer, a polyhydroxymethylvinylfuran (co)polymer, a polymethoxymethylvinylfuran (co)polymer, a polyethoxymethylvinylfuran (co)polymer, a polypropoxymethylvinylfuran (co)polymer, a polybutoxymethylvinylfuran (co)polymer and a polyacetoxymethylvinylfuran (co)polymer.

3. The toner for electrostatic image development according to claim 1, wherein the vinyl polymer is a copolymer having the structural unit represented by the general formula (1) and a structural unit derived from a (meth)acrylate monomer.

4. The toner for electrostatic image development according to claim 1, wherein the vinyl polymer is a copolymer having the structural unit represented by the general formula (1), a structural unit derived from a (meth)acrylate monomer, and a structural unit derived from a styrene monomer.

5. The toner for electrostatic image development according to claim 1, wherein in the structural unit represented by the general formula (1) $R^1$ is —$CH_2OR^2$, and $R^2$ is an alkyl group having 1 to 4 carbon atoms.

6. The toner for electrostatic image development according to claim 1, wherein the content of the structural unit represented by the general formula (1) in the resin is 30 to 77% by mass.

7. The toner for electrostatic image development according to claim 1, wherein the content of the structural unit represented by the general formula (1) in the toner particles is 27 to 70% by mass.

8. A production process of a toner for electrostatic image development, which is a process of producing the toner for electrostatic image development as set forth in claim 1, the process comprising:
synthesizing a vinyl polymer having a structural unit represented by the general formula (1) as set forth in claim 1 through a polymerization reaction performed in an aqueous medium using at least a polymerizable monomer represented by the following general formula (2):

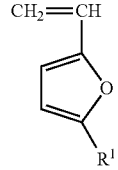

General formula (2)

[in the general formula (2), $R^1$ is a hydrogen atom, —$CH_2OH$, —$CH_2OR^2$, or —$CH_2O(C=O)R^3$, and $R^2$ and R3 are each an alkyl group having 1 to 8 carbon atoms].

9. The production process of the toner for electrostatic image development according to claim 8, further comprising forming the toner particles by aggregating fine resin particles formed of the vinyl polymer in an aqueous medium.

* * * * *